(12) United States Patent
Liu et al.

(10) Patent No.: US 8,450,708 B2
(45) Date of Patent: May 28, 2013

(54) ARRANGEMENT FOR AND METHOD OF GENERATING UNIFORM DISTRIBUTED ILLUMINATION PATTERN FOR IMAGING READER

(75) Inventors: Rong Liu, Centereach, NY (US);
Edward Barkan, Miller Place, NY (US); Mark Drzymala, Commack, NY (US); Igor Vinogradov, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 373 days.

(21) Appl. No.: 12/792,222

(22) Filed: Jun. 2, 2010

(65) Prior Publication Data

US 2011/0297853 A1     Dec. 8, 2011

(51) Int. Cl.
*G06K 7/10*     (2006.01)

(52) U.S. Cl.
USPC ..................................... 250/566; 235/462.42

(58) Field of Classification Search
USPC .......................... 250/566; 235/462.41–462.43
See application file for complete search history.

(56) References Cited

U.S. PATENT DOCUMENTS

| | | |
|---|---|---|
| 4,613,895 A | 9/1986 | Burkey et al. |
| 4,794,239 A | 12/1988 | Allais |
| 5,703,349 A | 12/1997 | Meyerson et al. |
| 5,756,981 A | 5/1998 | Roustaei et al. |
| 2010/0078483 A1* | 4/2010 | Liu et al. .................. 235/462.42 |

FOREIGN PATENT DOCUMENTS

WO     0165469 A1     9/2001

OTHER PUBLICATIONS

International Search Report for International Application No. PCT/US2010/062177 mailed on Apr. 19, 2011.
International Preliminary Report on Patentability dated Dec. 13, 2012 in related application PCT/US2010/062177.
Office Action dated Jan. 17, 2013 in related European patent application 10816398.1.

\* cited by examiner

*Primary Examiner* — Thanh Luu
(74) *Attorney, Agent, or Firm* — Nong-Qiang Fan

(57) ABSTRACT

A substantially uniform distributed illumination pattern of light is generated on and along a symbol to be read by image capture. A solid-state imager is mounted on a tilted printed circuit board in a tilted handle of an ergonomic reader. An imaging lens assembly captures return light over a field of view from the symbol along an imaging axis, and projects the captured return light onto the imager. An illumination light source is mounted on the board for emitting illumination light at an acute angle of inclination relative to the imaging axis. An optical component includes a first lens portion with a polynomial incident surface for intercepting, bending and aligning the emitted illumination light to generate the pattern in a scan direction along the symbol, and a second lens portion with a toroidal or cylindrical aspherical surface for collimating the aligned illumination light to generate the pattern in a transverse direction.

18 Claims, 4 Drawing Sheets

ARRANGEMENT FOR AND METHOD OF GENERATING UNIFORM DISTRIBUTED ILLUMINATION PATTERN FOR IMAGING READER

DESCRIPTION OF THE RELATED ART

Solid-state imaging systems or imaging readers have been used, in both handheld and/or hands-free modes of operation, to electro-optically read targets, such as one-dimensional bar code symbols, particularly of the Universal Product Code (UPC) symbology having a row of bars and spaces spaced apart along a scan direction, as well as two-dimensional symbols, such as the Code 49 symbology having a plurality of vertically stacked rows of bar and space patterns in a single symbol, as described in U.S. Pat. No. 4,794,239.

The handheld imaging reader includes a housing having a handle held by an operator, and an imaging module supported by the housing and aimed by the operator at the symbol during reading. The imaging module includes a solid-state imager with a sensor array of photocells or light sensors, which correspond to image elements or pixels in a field of view of the imager, and an imaging lens assembly for capturing return light scattered and/or reflected from the symbol being imaged along an imaging axis, and for projecting the return light onto the sensor array to initiate capture of an image of the symbol. Such an imager may include a one- or two-dimensional charge coupled device (CCD) or a complementary metal oxide semiconductor (CMOS) device and associated circuits for producing and processing electronic signals corresponding to a one- or two-dimensional array of pixel data over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

In order to increase the amount of the return light captured by the sensor array, especially in dimly lit environments and/or at far range reading, the imaging module generally also includes an illuminating light assembly for illuminating the symbol with illumination light for reflection and scattering therefrom. When the sensor array is one-dimensional, i.e., linear, or is two-dimensional with an anamorphic field of view, the illumination light preferably is distributed along a short height, distributed illumination pattern, also termed an illuminating or scan line, that extends lengthwise along the symbol. The distributed illumination pattern is typically generated by using a single light source, e.g., a light emitting diode (LED) sized in the millimeter range and a single cylindrical lens.

Although generally satisfactory for its intended purpose, the use of the single LED and the single cylindrical lens has been problematic, because the distributed illumination pattern typically has a height taller than that desired, does not have sharp edges, is dominated by optical aberrations, and is nonuniform in intensity since the light intensity is brightest along an optical axis on which the LED is centered, and then falls off away from the axis, especially at opposite end regions of the distributed illumination pattern. Also, the coupling efficiency between the LED and the cylindrical lens has been poor. Adding an aperture stop between the LED and the cylindrical lens will improve the sharpness (i.e., shorten the height) of the distributed illumination pattern, but at the cost of a poorer coupling efficiency and a dimmer distributed illumination pattern that, of course, degrades reading performance.

For a brighter distributed illumination pattern, a pair of spaced-apart LEDs and a pair of cylindrical lenses could be employed. However, this further increases cost, introduces more optical aberrations, and further reduces coupling efficiency. Also, the illumination light emitted by the pair of LEDs overlap at a central region of the distributed illumination pattern, thereby creating a bright, "hot" spot and abrupt light intensity transitions in the distributed illumination pattern, all of which can cause reading performance to deteriorate.

The known imaging systems are located up close near a reader housing window through which the illumination light and the return light pass. Hence, the field of view of the imaging lens assembly is relatively wide in order to reliably read symbols located in the near range of working distances relative to the window. This, in turn, reduces resolution at the far range of working distances relative to the window and also spreads the illumination over a wider area, thereby reducing its intensity and again decreasing reading performance.

For good ergonomics, the handle of the housing is advantageously rearwardly tilted, for example, by about fifteen degrees relative to the vertical. The illuminating light assembly may advantageously be mounted on a printed circuit board (PCB) mounted in the tilted handle and, therefore, also tilted relative to the vertical. The illumination light emitted by the LEDs on-board the tilted PCB, therefore, needs to be redirected and aligned with the generally horizontal imaging axis of the imaging lens. Known imaging readers insure such alignment by configuring the handle and the PCB therein to be strictly vertical, but this results in a housing with a poor ergonomic design that increases operator fatigue and discomfort and decreases productivity.

SUMMARY OF THE INVENTION

One feature of the present invention resides, briefly stated, in an arrangement for generating a substantially uniform distributed illumination pattern of light on and along a symbol to be read by image capture. The arrangement includes an imaging system having a solid-state imager with an array of image sensors, such as a CCD or a CMOS, and an imaging lens assembly for capturing return light over a field of view from the symbol along an imaging axis, and for projecting the captured return light onto the array. The array is one-dimensional, i.e., linear, or is two-dimensional with an anamorphic field of view. The field of view of the imaging system is generally perpendicular to the imaging axis and generally matches the distributed illumination pattern of light on and along the symbol. The imaging lens assembly preferably includes a plurality of imaging lenses, advantageously a doublet or a Cooke triplet, spaced apart along the imaging axis, or in close proximity with one another.

The arrangement further includes an illuminating light assembly having an illumination light source for emitting illumination light at an acute angle of inclination relative to the imaging axis, and an optical component including a first lens portion for intercepting, bending and aligning the emitted illumination light to generate the substantially uniform distributed illumination pattern of light along the symbol in a scan direction generally perpendicular to the imaging axis, and a second lens portion for collimating the aligned illumination light in a transverse direction generally perpendicular to the scan direction to generate the substantially uniform distributed illumination pattern of light on the symbol.

Advantageously, the optical component can comprise a lower half of a full size lens symmetrical about an optical axis that is offset from the imaging axis.

The light source includes at least one light emitting diode (LED) and, preferably, a plurality of LEDs, such as a pair of LEDs spaced apart along a scan direction lengthwise of the symbol. An aperture stop is positioned between each LED and the optical component, preferably in close proximity to the LED, for limiting the vertical extent or height of the emitted illumination light incident on the optical component and, in turn, the vertical height of the distributed illumination pattern along the transverse direction. The LEDs and the array are preferably surface mounted on a printed circuit board (PCB) tilted at the acute angle of inclination relative to the imaging axis. In the preferred embodiment, the tilted PCB is mounted within a tilted handle of an ergonomic imaging reader for electro-optically reading the symbol by image capture. The reader has a window through which the return light and the distributed illumination pattern of light pass. The window may be tilted relative to the imaging axis to avoid reflections of the emitted illumination light from reaching the imaging lens assembly. The imaging lens assembly is located remotely from the window, for example, over forty millimeters away.

The emitted illumination light from each LED overlap in a central zone of the distributed illumination pattern. Hence, to reduce light intensity in the central zone, the first lens portion is configured with an incident polynomial surface, also operative for optically modifying the illumination light to lie generally along a straight line along the scan direction. The second lens portion is configured with an exit toroidal or cylindrical aspherical surface for projecting the illumination light of limited vertical height passing through the aperture stop towards the symbol, and for collimating the aligned illumination light on the symbol. The optical component may be a unitary lens extending along the scan direction between the LEDs, or a pair of discrete lenses, one for each LED, each lens being configured with the first and second lens portions.

In accordance with this invention, the optical component forms the distributed illumination pattern on and along the symbol with a uniform intensity not dominated by optical aberrations or abrupt intensity transitions. The coupling efficiency between the light source and the optical component is much improved, thereby increasing light throughput, enhancing reading performance, and improving visibility of the distributed illumination pattern. Reader ergonomics is enhanced.

Another feature of the present invention resides in a method of generating the substantially uniform distributed illumination pattern of light on and along the symbol to be read by image capture. The method is performed by capturing return light over a field of view from the symbol along an imaging axis, projecting the captured return light onto a solid-state imager, emitting illumination light at an acute angle of inclination relative to the imaging axis, intercepting, bending and aligning the emitted illumination light with a first lens portion of an optical component, and collimating the aligned illumination light with a second lens portion of the optical component to generate the substantially uniform distributed illumination pattern of light on and along the symbol.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
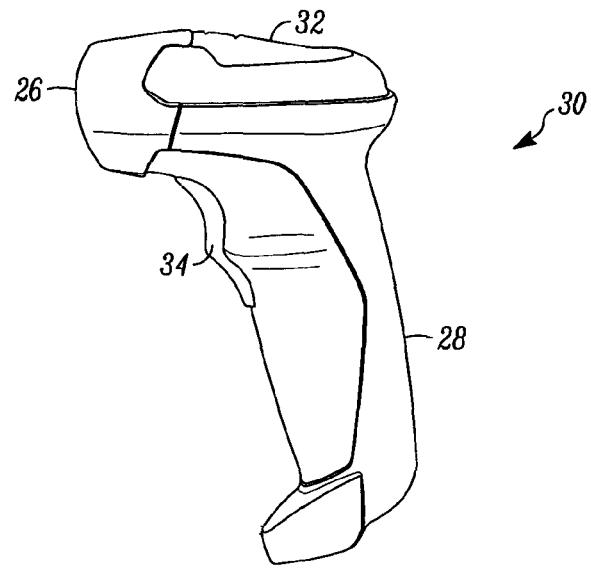
FIG. 1 is a side elevational view of a portable imaging reader operative for generating a substantially uniform distributed illumination pattern of light on and along a target or symbol to be read by image capture in accordance with this invention.
Figure 5:
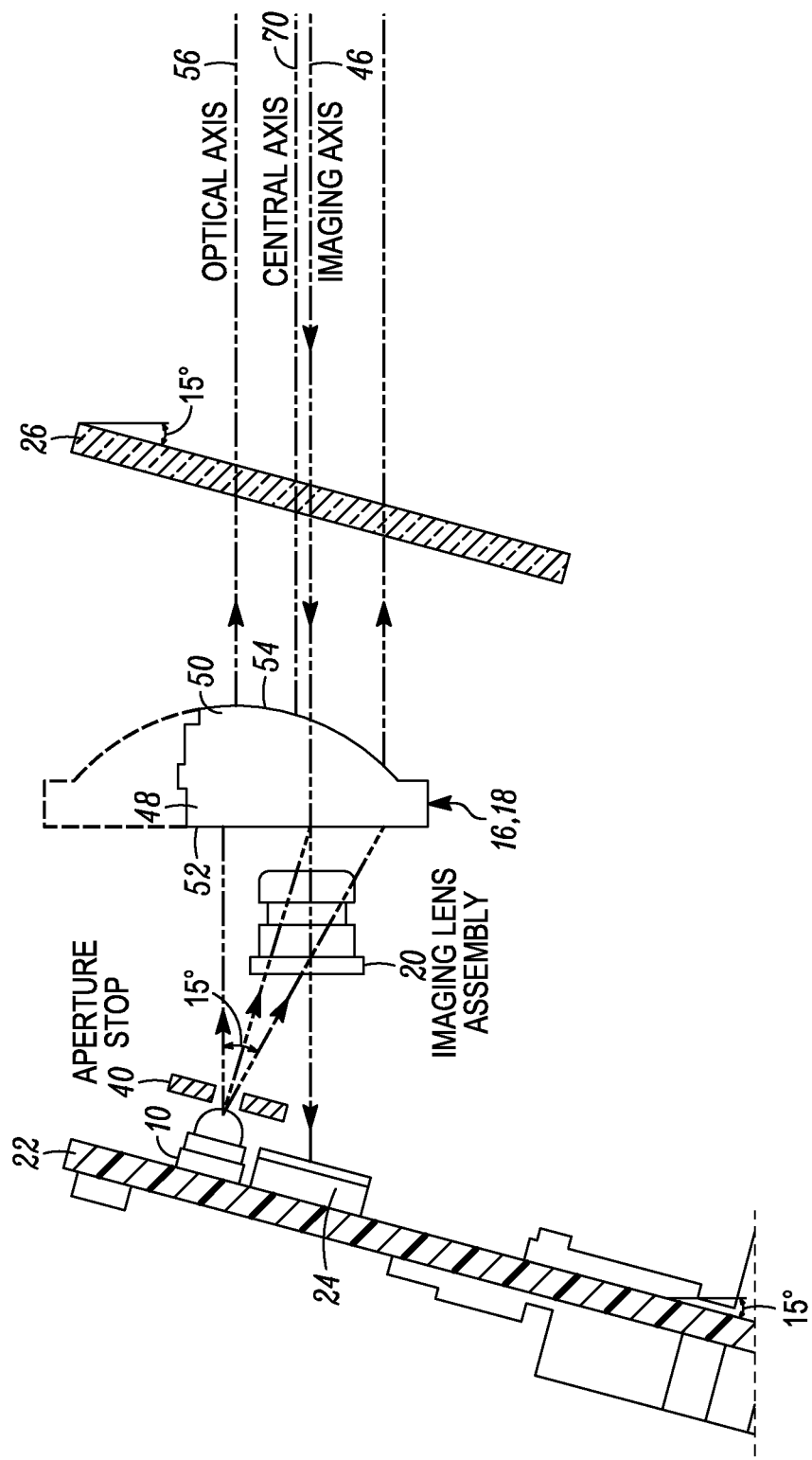
FIG. 5 is a broken-away, enlarged side view depicting operation of the illuminating light assembly of FIG. 4.

Reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A window 26 is located adjacent the front or nose of the body 32 and is preferably also tilted at an angle of inclination, for example, fifteen degrees, as best shown in FIG. 5, relative to the vertical. The imaging reader 30 is held in an operator's hand and used in a handheld mode in which a trigger 34 is manually depressed to initiate imaging of target indicia, especially one-dimensional symbols, to be read in a range of working distances relative to the window 26. Housings of other configurations can also be employed.

Figure 2:
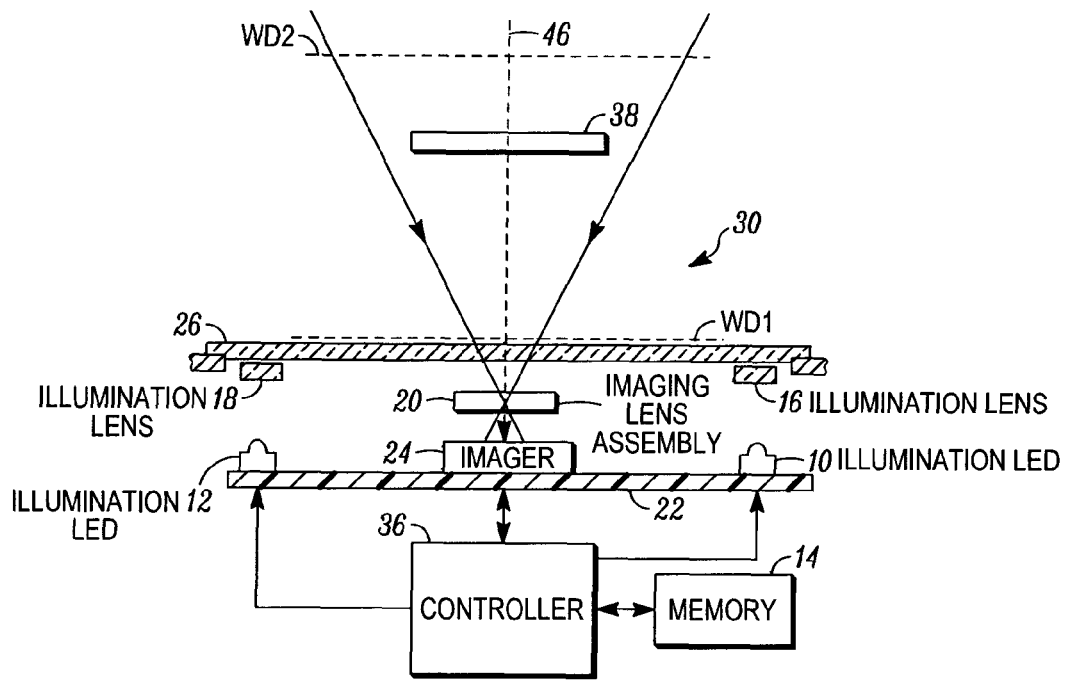
FIG. 2 is a schematic diagram of various components of the reader of FIG. 1.

As schematically shown in FIG. 2, an imaging system or module includes an imager 24 mounted on a printed circuit board (PCB) 22 in the reader 30. The PCB 22 is mounted within the tilted handle 28 and, as best shown in FIG. 5, is also tilted at an angle of inclination, for example, fifteen degrees, relative to the vertical. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, preferably with an anamorphic field of view, and operative for detecting return light captured by an imaging lens assembly 20 along an imaging axis 46 through the window 26. The return light is scattered and/or reflected from a target or symbol 38 over the field of view. The field of view is generally perpendicular to the imaging axis 46.

Figure 6:
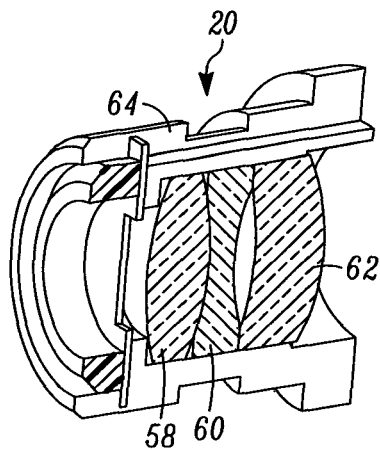
FIG. 6 is a broken-away, enlarged sectional view of the imaging lens assembly.

The imaging lens assembly 20 is part of the imaging system and is operative for focusing the return light onto the array of image sensors to enable the symbol 38 to be read. Details of the imaging lens assembly 20, as best seen in FIG. 6, are described below. The symbol 38 may be located anywhere in a working range of distances between a close-in working distance (WD1) and a far-out working distance (WD2). In a preferred embodiment, WD1 is about one-half inch from the window 26, and WD2 is about thirty inches from the window 26. The imaging lens assembly 20 is located remotely from the window 26, for example, over forty millimeters away.

Figure 3:
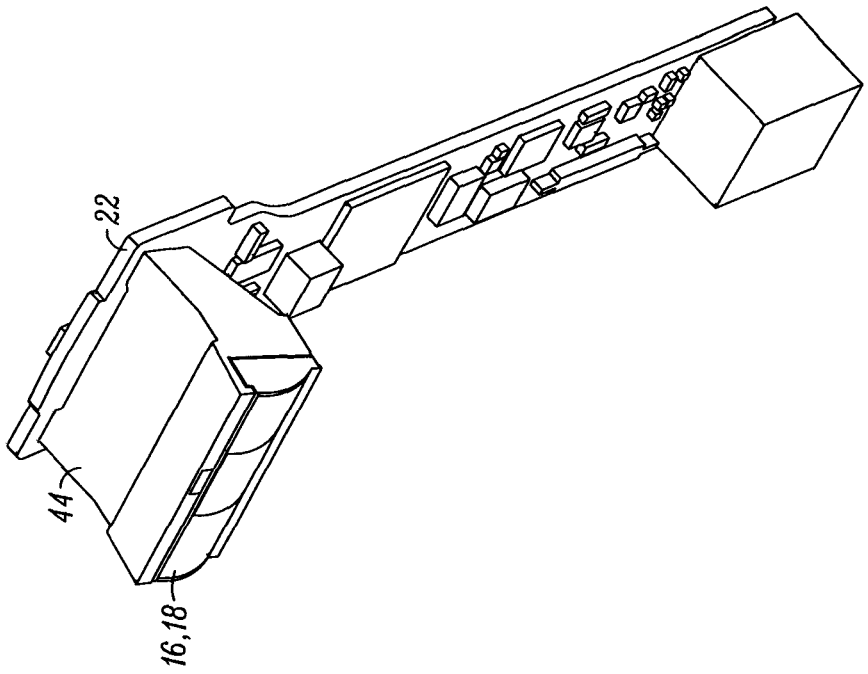
FIG. 3 is an exploded, perspective view of various components of the reader of FIG. 1, including the illuminating light assembly of FIG. 2.
Figure 4:
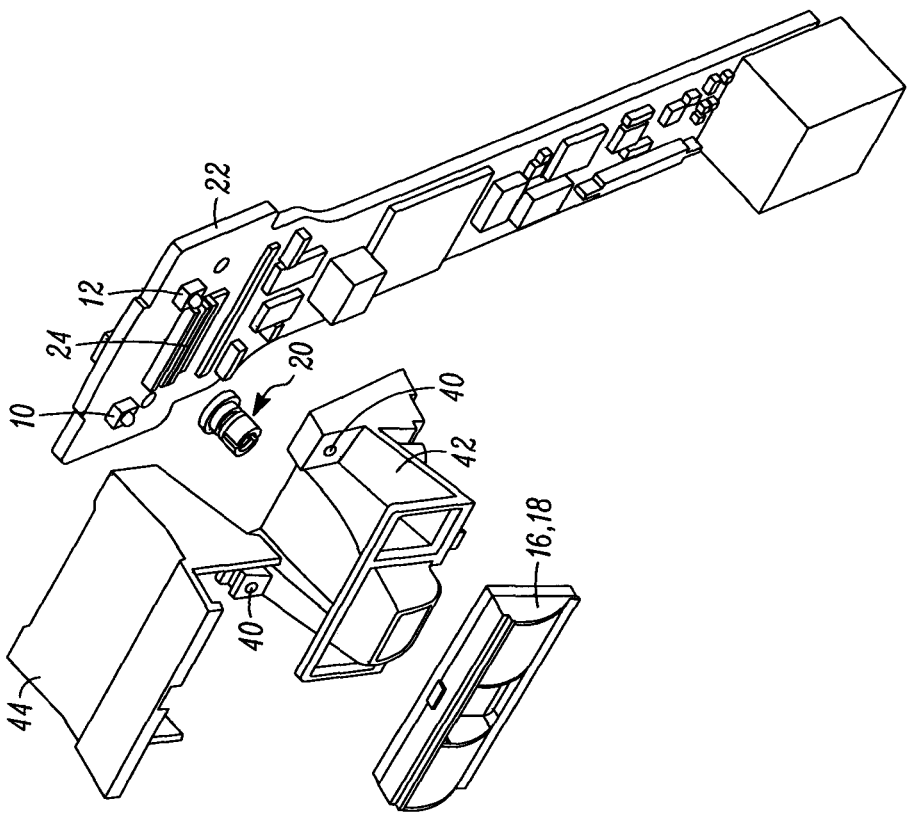
FIG. 4 is an assembled perspective view of the components of FIG. 3.
Figure 7:
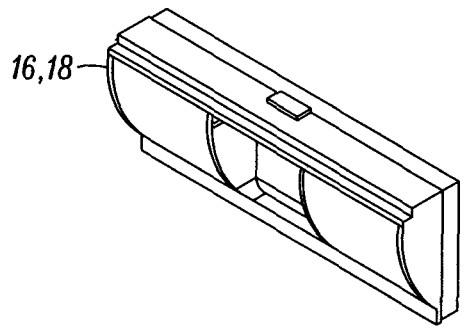
FIG. 7 is a perspective view of one embodiment of an optical component of the illuminating light assembly.
Figure 8:
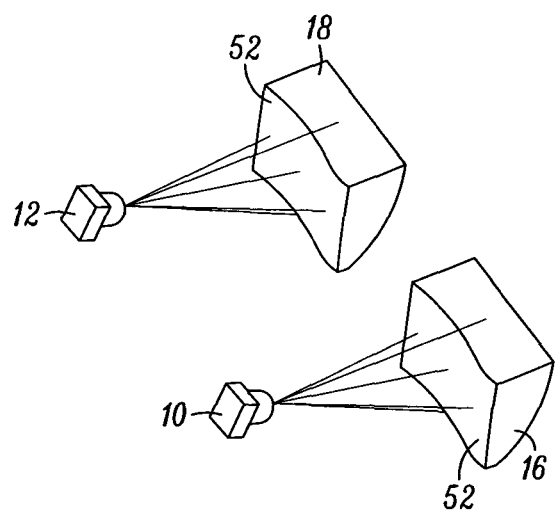
FIG. 8 is a perspective view of another embodiment of an optical component of the illuminating light assembly.

An illuminating light assembly is also mounted in the imaging reader and includes an illumination light source, e.g., at least one light emitting diode (LED), and preferably a plurality of LEDs, such as a pair of LEDs 10, 12, and an optical component configured to generate a substantially uniform distributed illumination pattern of light on and along the symbol 38 to be read by image capture. At least part of the scattered and/or reflected return light is derived from the illumination pattern of light on and along the symbol 38. The optical component can comprise a lower half of a full size lens (shown in dashed lines in FIG. 5) that is symmetrical about an optical axis 56. The optical component can be a unitary lens as shown in FIG. 7, or a pair of lenses 16, 18 as shown in FIG. 8. Details of the illuminating light assembly, as best seen in the FIGS. 3-5, are described below. The window 26 is tilted to avoid reflections of the illumination light from the LEDs 10,12 from reaching the imaging lens assembly 20.

As shown in FIG. 2, the imager 24 and the LEDs 10, 12 are operatively connected to a controller or microprocessor 36 operative for controlling the operation of these components. A memory 14 is connected and accessible to the controller 36. Preferably, the microprocessor is the same as the one used for processing the return light from target symbols 38 and for decoding the captured target images.

In operation, the microprocessor 36 sends a command signal to energize the LEDs 10, 12 for a short exposure time period, say 500 microseconds or less, and energizes and exposes the imager 24 to collect the return light, e.g., illumination light and/or ambient light, from the target symbol 38 only during said exposure time period. A typical array needs about 18-33 milliseconds to acquire the entire target image and operates at a frame rate of about 30-60 frames per second.

Turning now to FIGS. 3-5, both LEDs 10, 12 and the imager 24 are each surface mounted on the tilted PCB 22. Surface mounting eliminates the use of ribbon cables and separate PCBs and connectors. The LEDs 10, 12 are mounted at a higher elevation than, and at opposite sides of, the imager 24. The LEDs 10, 12 are spaced apart along a scan direction lengthwise of the symbol 38. When energized, each LED 10, 12 downwardly emits a beam of illumination light substantially towards the optical component 16, 18 at the acute angle of inclination relative to the generally horizontal imaging axis 46. An aperture stop 40 is positioned on the optical axis 56 in front of each LED, preferably in close proximity to the respective LED, for limiting the vertical extent or height of the emitted illumination light beam incident on the optical component 16, 18. The LEDs 10, 12 are contained in a casing 42 overlaid by a canopy 44. The optical component 16, 18 is supported at the front of the casing 42.

The optical component 16, 18 images each aperture stop 40 and includes a first lens portion 48 for intercepting, bending and aligning the emitted illumination light beams to generate the substantially uniform distributed illumination pattern of light along the scan direction that is generally perpendicular to the imaging axis 46, and a second lens portion 50 for vertically collimating the aligned illumination light beams along a transverse direction generally perpendicular to the scan direction. The emitted illumination light beams from the LEDs overlap in a central zone of the distributed illumination pattern. The first lens portion 48 is configured with an incident polynomial surface 52 for reducing the light intensity of the overlapping beams in the central zone, and for shaping the distributed illumination pattern as a generally straight line along the scan direction. The second lens portion 50 is configured with an exit toroidal or cylindrical aspherical surface 54 for projecting the illumination light of limited vertical height passing through the aperture stop 40 towards the symbol 38 and for collimating the aligned illumination light on and along the symbol 38. The optical component 16, 18 can be a unitary lens (see FIG. 7) extending along the scan direction between the LEDs 10, 12. Alternatively, the optical component comprises a pair of lenses 16, 18 (see FIG. 8), one for each LED, each lens 16, 18 separately having the first and second lens portions 48, 50 and separately configured with the incident polynomial surface 52 and the exit toroidal or cylindrical surface 54. Each polynomial surface 52 creates an asymmetrical light intensity pattern with less intense light at the central zone; hence, when the less intense light of both beams overlap at the central zone, they tend to match the intensity of the light at opposite end zones of the distribution pattern throughout the entire range of working distances.

As shown in FIG. 6, the imaging lens assembly 20 includes a plurality of imaging lenses 58, 60, 62, preferably configured as a doublet or a Cooke triplet, spaced apart along the imaging axis 46, or in close proximity with one another, and mounted in a holder 64. The center lens 60 has a negative power. The triplet compensates for optical aberrations.

Returning to FIG. 5, the center of the aperture stop 40 lies on, or is substantially parallel and close to, the optical axis 56 so that the outgoing emitted illumination light rays exiting the optical component 16, 18 are substantially parallel to the optical axis 56. A central axis 70 is defined as the geometric center of the optical component 16, 18 and is either collinear with, or substantially parallel and close to, the imaging axis 46. The central axis 70 is also substantially parallel to, and vertically offset from, the optical axis 56. In some embodiments, it may be desirable that the center of the aperture stop 40 be decentered or tilted with respect to the optical axis 56 so that the outgoing illumination light rays are directed at an angle of inclination relative to the central axis 70.

The arrangement of this invention wastes less illumination than prior art arrangements and better matches the illumination field of view to the field of view of the imaging system. This invention enables an imager of less resolution to be employed, but without sacrificing readability at far-out working distances.

It will be understood that each of the elements described above, or two or more together, also may find a useful application in other types of constructions differing from the types described above. For example, the optical component could be replaced by a lens and an optical wedge.

While the invention has been illustrated and described as an arrangement or module for, and a method of, generating a substantially uniform distributed illumination pattern of light on and along a symbol to be read by image capture by an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for generating a substantially uniform distributed illumination pattern of light on and along a symbol to be read by image capture, comprising:

an imaging system including a solid-state imager having an array of image sensors and an imaging lens assembly for capturing return light over a field of view from the symbol along an imaging axis, and for projecting the captured return light onto the array;

an illuminating light assembly including an illumination light source for emitting illumination light at an acute angle of inclination relative to the imaging axis, and an optical component including a first lens portion for intercepting, bending and aligning the emitted illumination light to generate the pattern in a scan direction along the symbol, and a second lens portion for collimating the aligned illumination light to generate the pattern in a transverse direction generally perpendicular to the scan direction; and wherein the light source includes a pair of light emitting diodes (LEDs) surface mounted on a printed circuit board (PCB) tilted at said acute angle of inclination relative to the imaging axis, and wherein the imager is also surface mounted on the PCB.

2. The arrangement of claim 1, wherein the optical component has a central axis, and an aperture stop having a center positioned with respect to the optical axis so that the emitted illumination light is directed at said angle of inclination relative to the central axis.

3. The arrangement of claim 1, wherein the light source includes at least one light emitting diode (LED), and an aperture stop between the LED and the optical component for limiting a transverse size of the emitted illumination light incident on the optical component along the transverse direction.

4. The arrangement of claim 1, wherein the light source includes a pair of light emitting diodes (LEDs) spaced apart along the scan direction lengthwise of the symbol, wherein the emitted illumination light from each LED overlap in a central zone of the distributed illumination pattern, and wherein the first lens portion has an incident polynomial surface for reducing light intensity in the central zone and for shaping the distributed illumination pattern to lie linearly along the scan direction.

5. The arrangement of claim 1, wherein the second lens portion has an exit toroidal or cylindrical aspherical surface for collimating the aligned illumination light.

6. The arrangement of claim 1, wherein the light source includes a pair of light emitting diodes (LEDs) spaced apart along the scan direction lengthwise of the symbol, and wherein the optical component is a unitary lens extending along the scan direction between the LEDs.

7. The arrangement of claim 1, wherein the light source includes a pair of light emitting diodes (LEDs) spaced apart along the scan direction lengthwise of the symbol, and wherein the optical component comprises a pair of lenses, one for each LED, each lens having the first and second lens portions.

8. An arrangement for generating a substantially uniform distributed illumination pattern of light on and along a symbol to be read by image capture, comprising:

an imaging system including a solid-state imager having an array of image sensors and an imaging lens assembly for capturing return light over a field of view from the symbol along an imaging axis, and for projecting the captured return light onto the array;

an illuminating light assembly including an illumination light source for emitting illumination light at an acute angle of inclination relative to the imaging axis, and an optical component including a first lens portion for intercepting, bending and aligning the emitted illumination light to generate the pattern in a scan direction along the symbol, and a second lens portion for collimating the aligned illumination light to generate the pattern in a transverse direction generally perpendicular to the scan direction; and wherein the optical component has a central axis, and an aperture stop having a center lying on an optical axis that is offset from, and generally parallel to, the central axis along the transverse direction.

9. An imaging reader for electro-optically reading a symbol by image capture, comprising:

a housing having an ergonomic handle tilted at an acute angle of inclination relative to the vertical;

a printed circuit board (PCB) mounted in the handle and tilted at said acute angle of inclination; and an imaging module supported by the housing, the module including an imaging system including a solid-state imager having an array of image sensors mounted on the PCB, and an imaging lens assembly for capturing return light over a field of view from the symbol along an imaging axis, and for projecting the captured return light onto the array, and an illuminating light assembly including an illumination light source mounted on the PCB for emitting illumination light at said acute angle of inclination relative to the imaging axis, and an optical component including a first lens portion for intercepting, bending and aligning the emitted illumination light to generate the pattern in a scan direction along the symbol, and a second lens portion for collimating the aligned illumination light to generate the pattern in a transverse direction generally perpendicular to the scan direction.

wherein the printed circuit board (PCB) is tilted at said acute angle of inclination relative to the imaging axis.

10. The reader of claim 9, wherein the light source includes a pair of light emitting diodes (LEDs) spaced apart along the scan direction lengthwise of the symbol, wherein the emitted illumination light from each LED overlap in a central zone of the distributed illumination pattern, wherein the first lens portion has an incident polynomial surface for reducing light intensity in the central zone and for shaping the distributed illumination pattern to lie linearly along the scan direction, and wherein the second lens portion has an exit toroidal or cylindrical aspherical surface for collimating the aligned illumination light.

11. The reader of claim 9, wherein the housing has a window through which the return light and the distributed illumination pattern of light pass, and wherein the imaging lens assembly is located remotely from the window.

12. A method of generating a substantially uniform distributed illumination pattern of light on a symbol to be read by image capture, comprising the steps of:

capturing return light over a field of view from the symbol along an imaging axis, and projecting the captured return light onto a solid-state imager;

emitting illumination light at an acute angle of inclination relative to the imaging axis;

intercepting, bending and aligning the emitted illumination light to generate the pattern in a scan direction along the symbol with a first lens portion of an optical component;

collimating the aligned illumination light to generate the pattern in a transverse direction generally perpendicular to the scan direction; and wherein the emitting step is performed by a pair of light emitting diodes (LEDs), and surface mounting the LEDs and the imager on a printed circuit board (PCB) tilted at said acute angle of inclination relative to the imaging axis.

13. The method of claim 12, wherein the emitting step is performed by at least one light emitting diode (LED), and limiting a transverse size of the emitted illumination light intercepted by the optical component along the transverse direction by positioning an aperture stop between the LED and the optical component.

14. The method of claim 12, wherein the emitting step is performed by a pair of light emitting diodes (LEDs) spaced apart along the scan direction lengthwise of the symbol, wherein the emitted illumination light from each LED overlap in a central zone of the distributed illumination pattern, and configuring the first lens portion with an incident polynomial surface for reducing light intensity in the central zone and for shaping the distributed illumination pattern to lie linearly along the scan direction.

15. The method of claim 12, and configuring the second lens portion with an exit toroidal or cylindrical aspherical surface for collimating the aligned illumination light.

16. The method of claim 12, wherein the emitting step is performed by a pair of light emitting diodes (LEDs) spaced apart along the scan direction lengthwise of the symbol, and configuring the optical component as a unitary lens extending along the scan direction between the LEDs.

17. The method of claim 12, wherein the emitting step is performed by a pair of light emitting diodes (LEDs) spaced apart along the scan direction lengthwise of the symbol, and configuring the optical component as a pair of lenses, one for each LED, each lens being configured with the first and second lens portions.

18. A method of generating a substantially uniform distributed illumination pattern of light on a symbol to be read by image capture, comprising the steps of:
- capturing return light over a field of view from the symbol along an imaging axis, and projecting the captured return light onto a solid-state imager;
- emitting illumination light at an acute angle of inclination relative to the imaging axis;
- intercepting, bending and aligning the emitted illumination light to generate the pattern in a scan direction along the symbol with a first lens portion of an optical component;
- collimating the aligned illumination light to generate the pattern in a transverse direction generally perpendicular to the scan direction; and
- providing the optical component with a central axis, and positioning an aperture stop with a center lying on an optical axis that is offset from, and generally parallel to, the central axis along the transverse direction.

* * * * *